Nov. 7, 1950 C. B. IVES 2,529,254
CONTROLLER
Filed Feb. 24, 1947 2 Sheets-Sheet 2

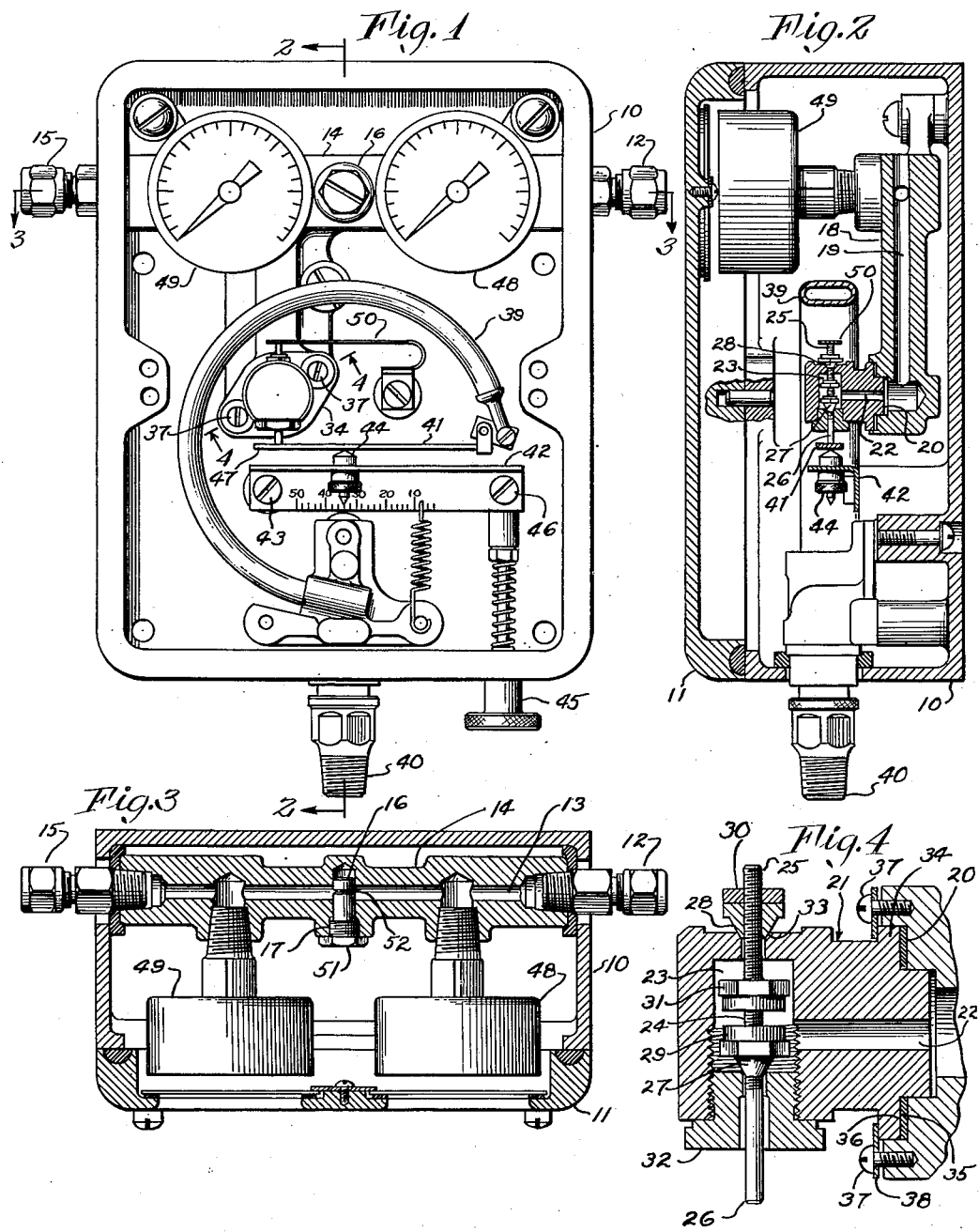

INVENTOR
CLIFFORD B. IVES
BY
Hammond & Littell
ATTORNEYS

Patented Nov. 7, 1950

2,529,254

UNITED STATES PATENT OFFICE 2,529,254

CONTROLLER

Clifford B. Ives, Tenafly, N. J., assignor to Kieley & Mueller, Inc., North Bergen, N. J., a corporation of New York Application February 24, 1947, Serial No. 730,650

8 Claims. (Cl. 137—153)

1

This invention relates to improvements in regulating mechanisms and particularly apparatus to control a condition, such as pressure, by operating a fluid pressure relay or pilot valve, said pilot valve controlling a fluid pressure to regulate a valve or other device to maintain the condition, such as pressure, at a desired value.

One example of the use of such a mechanism is the regulation of the pressure of a vapor in a chamber by control of the flow of high pressure vapor to the chamber by means of a condition controller. One type of suitable condition controller is a diaphragm operated valve which can be located in the high pressure vapor supply line to the chamber. The diaphragm valve may be operable by a controlling medium such as air, the pressure of the controlling air being regulated by the relay or pilot valve. The pilot valve can be positioned by means of a condition responsive element, such as a bourdon tube, responsive to the pressure in the chamber. A source of control air is connected to the pilot valve through a restricted orifice between the valve and the source of air, the diaphragm motor valve also being connected to said pilot valve. When the pilot valve is open, air will be exhausted therefrom faster than it is supplied through the restricted orifice and thus will cause a reduction in controlling air pressure affecting the diaphragm valve.

Diaphragm or other pressure operated valves are commonly furnished for use with regulating systems that are of the type that close upon an increase in control pressure, or of the type that open upon an increase of pressure. It is desirable, therefore, to provide a regulating apparatus that may be used with either type of valve or control mechanism so that the regulating apparatus can be used regardless of the kind of diaphragm valve available or the valve already in use where the regulator is to be applied to an existent system.

One of the objects of the invention is to provide a regulating apparatus that can be changed or adjusted easily so as to produce either an increase or decrease in control pressure in response to a change in the condition to be controlled in one direction away from a predetermined value.

Another object of the invention is to provide an easily cleaned restricted orifice especially suitable for use in a regulating apparatus of the type described.

One of the features of the invention is the arrangement of the pilot valve on a seat in the frame of the regulator so that the pilot valve can

2 have its action reversed by merely turning the valve on said seat without changing any other parts of the apparatus.

The invention may be applied to regulating apparatus other than the control of pressure and can be actuated by other condition responsive means than a bourdon tube such as, for example, by an expanding fluid motor.

These and other objects, features, and advantages will become apparent from the following description and illustrations which are merely exemplary.

In the drawings:

Fig. 1 is a front elevation with the cover of the casing removed.

Fig. 2 is a sectional elevation taken in the direction 2—2 of Fig. 1 with the cover of the casing shown in place.

Fig. 3 is a sectional view taken in the direction 3—3 of Fig. 1 with the casing cover shown in place.

Fig. 4 is an enlarged sectional view taken in the direction 4—4 of Fig. 1, showing the details of the mounting for the valve casing.

Figure 5:
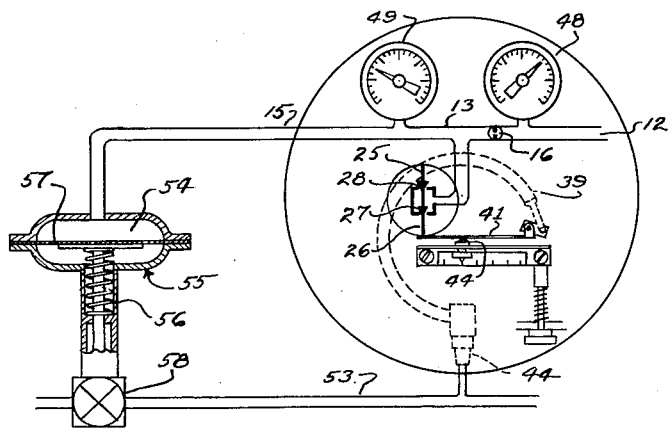
Fig. 5 is a schematic view showing the operation of the device with the pilot valve turned in a direct acting position or one wherein increase of control air pressure in response to increase in pressure will close the diaphragm valve.

In a preferred embodiment of the invention, a bourdon tube mechanism is used to position a pilot valve for regulating the pressure of an operating fluid for a control mechanism. The operating fluid may be air, and the control mechanism may be some suitable apparatus, such as a diaphragm-operated valve. Other equivalent valve operators or control mechanism may be used, examples being bellows and piston operated valves. The pilot valve is connected to the source of air pressure through a restricted orifice, and the diaphragm motor valve is connected to the pilot valve or the source of air pressure after the air has passed through said orifice. When the pilot valve is closed, the diaphragm motor valve will become subjected to full air pressure because the pressure on both sides of the orifice will become equalized. After the pressures have become equalized and when the pilot valve is opened, air will be exhausted therefrom faster than air will be supplied through the orifice so that pressure to the diaphragm valve will be decreased from the pressure of the source of air.

Housing or casing 10 may have a suitable cover 11 (Figs. 2 and 3) to protect the mechanism. Control air supply pipe 12 may be connected to passage 13 (Fig. 3) of manifold 14, said passage 13 extending through the manifold to the connection 15 to the diaphragm motor valve. Restricted orifice 16 may be screw threadedly engaged at 17 into manifold 14, said orifice construction being described in detail at a later point. Manifold 14 has a branch 18 with a passage 19 communicating with passage 13, said passage 19 leading to the manifold pilot valve body seat 20 (Figs. 2, 4), said valve body seat rotatably supporting valve body 21 in one of a plurality of predetermined positions. Valve body 21 has a passage 22 therein connecting interior 23 of said valve body 21 with passage 19.

The valve assembly in the form shown may comprise valve spindle 24 having stem portions 25 and 26 extending in opposite directions through opposite sides of valve body 21. The stem may be threaded so as to adjustably carry valve disks 27, 28, said valve disks being provided with suitable lock nuts 29, 30. The spindle 24 may have a valve travel limiting nut and lock nut 31. Pilot valve seat 32 may be screw threadedly mounted on valve body 21 so that the valve may be assembled with ease, and the upper valve seat 33 suitably may be formed on the exterior of the valve body 21.

As previously mentioned, the system to be controlled in some instances is arranged so that an increase in pressure in the controlled medium requires closing of the pilot valve to increase control air pressure to the motor valve, and in other instances the mechanism is arranged so that an increase in pressure in the controlled medium requires opening of the pilot valve to reduce control air pressure. In order to readily use the controller with either system, the pilot valve needs to be easily reversible. To provide for such a reversibility, valve body 21 has flange 34 with a circular seat 35 which is rotatably engageable with the manifold valve body seat 20 of manifold branch 18. A gasket 36 may be provided for said seat so as to properly seal the valve body relative to the manifold 18 in any one of its adjusted positions.

A pair of screws 37 (Figs. 1 and 4) may have washers 38 engageable with flange 34 of the valve body and when said screws are tightened, valve body 21 will be held firmly in position on manifold valve body seat 20. Upon loosening said screws, the valve body may be grasped and turned on said seat and thus the valve can be located in a direct acting position or in a reverse acting position as desired.

A condition responsive element 39, which may take the form of the conventional bourdon tube, is mounted in housing 10, said tube being connected, for example, through pipe 40 with a source of pressure which is variable in accordance with the condition controlled or is the pressure of the medium to be controlled. Fulcrum arm 41 is pivotally mounted at one end to the bourdon tube, said arm comprising a flat strip or other suitable shape.

Fulcrum support arm 42 may be pivoted at 43 to the casing 10, said fulcrum support arm in the form shown being an angle with a slot or aperture therein carrying the adjustable fulcrum 44. Adjusting nut 45 is connected at 46 to fulcrum support arm 42 for pivoting said fulcrum support arm 42 about pivot 43. As the support arm is rotated about pivot 43, the fulcrum 44 will be raised or lowered and thus will change the magnitude of the pressure being controlled or the control point of the controller.

In order to change the throttling characteristics of the controller, fulcrum 44 is adjustable along the fulcrum support arm 42. Such an adjustment will control the width of the proportional throttling band of the pressure pilot. The ratio of movement of end 47 of the fulcrum arm relative to the end connected to the bourdon tube 39 will be controlled by the relative position of fulcrum 44 to said two ends. If fulcrum 44 is to the extreme right of lever 42, it will become apparent that a slight movement of the bourdon pressure tube 39 will cause a large movement of end 47 so that the pressure pilot valve will become practically an on-off controller. As the fulcrum is moved farther to the left, a greater movement of the bourdon tube will be necessary for a corresponding movement of the pressure pilot valve so that the pressure pilot valve will have a band wherein a proportioning or throttling regulation is effected; that is, there will be a regulating movement of the valve between its full open and full closed position by the bourdon tube. In the specific arrangement shown, the proportional band may be varied from 1% to 75% of the pilot pressure range. It is also evident that further adjustment of operation may be made by adjusting the various elements of the valve assembly on spindle 24.

Gauge 48 may be used to indicate the pressure of the control supply air, and gauge 49, to indicate the pressure of the controlling air to the diaphragm motor valve.

When the valve is in the position shown in Figs. 1 to 5, or a direct acting position, increase of pressure in the bourdon tube will rotate the fulcrum arm 41 about fulcrum 44 counterclockwise so as to cause valve spindle 24 to move downwardly and valves 27 and 28 to close, a spring 50 being provided so as to assist movement of the valve spindle downwardly against fulcrum arm 41. When the pilot valve is closed, escape of the control medium or air past valve disks 27 and 28 is stopped so that control air pressure will build up in line 15 to the diaphragm motor valve.

As the pressure in the bourdon tube decreases, the tube will contract so as to open valves 27 and 28 and allow air to escape from passage 19 and the diaphragm motor valve line 15 because restricted orifice 16 will prevent control air from feeding into passage 18 faster than it leaks out through the pilot valve.

When the controller is arranged for a direct acting valve as just described and a reverse acting position is necessary, the pilot valve body 21 is reversed by merely loosening screws 37, grasping the valve body and rotating it 180 degrees on seat 20, and then tightening the screws again. Stem end 25 then will be in contact with end 47 of the fulcrum arm 41 so that an increase of pressure in the bourdon tube will allow the valves 27 and 28 to open.

As an example of operation of the direct acting pilot valve in a control system wherein steam pressure in a pipe is being controlled, reference may be made to Fig. 5 wherein air is supplied through pipe 12 to passage 13 passing through restricted orifice 16. When the steam pressure in pipe 53 leading to the point of use becomes reduced, the bourdon tube 39 will contract rotating fulcrum arm 41 clockwise so as to open the pilot valve. This will allow air to escape through the pilot valve faster than it is supplied through orifice 16 and therefore cause a lowering of pressure in the space 54 in the diaphragm motor valve 55. When this occurs, spring 56 will raise the diaphragm 57 and open valve 58 to allow more steam to be supplied to pipe 53.

Figure 6:
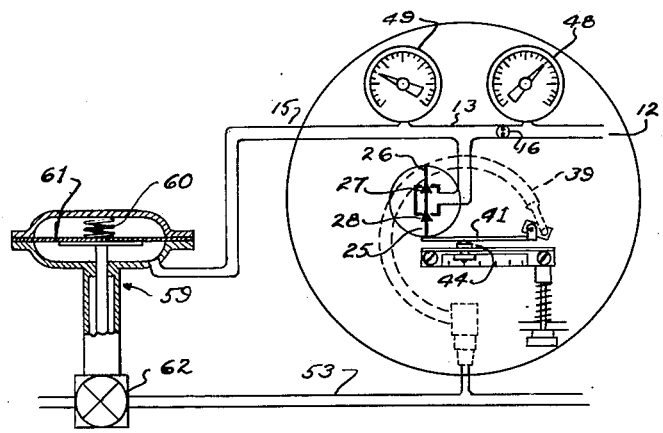
Fig. 6 is a schematic view of the device showing the pilot valve turned in a reverse acting direction.

If the pilot valve is turned as shown in Fig. 6 so as to be in a reverse acting position suitable for operating a diaphragm motor valve which is the reverse of that shown in Fig. 5, a decrease of pressure in steam pipe 53 will cause the pilot valve to close, thereby increasing pressure under the diaphragm 61 of the diaphragm motor valve 59. This will compress spring 60 and open valve 62 so as to admit more steam to the pipe 53.

The restricted orifice 16 may take the form of a screw threaded member 51 with an annular recess 52 cut therein to give a passage of the correct size in conjunction with the walls of passage 13. When it is desired to clean the orifice, it is merely necessary to unscrew member 51 and remove the same from the manifold. A cloth, finger nail, or other object then can be passed around the recess 52 to clean the same. After this, the orifice plug may be inserted and the device will then be ready for operation in a cleaned condition. As is well known, it is difficult to clean the conventional orifice and frequently the orifice passage is damaged when a wire or other cleaner is passed therethrough.

Other types of apparatus and systems may be operated by the described pilot valve wherein temperature or other condition to be controlled may be used to position the pilot valve. Also the controlled diaphragm or fluid pressure motor may operate switches or mechanisms other than a valve to control the flow to the process being operated wherein it is desired to maintain a selected physical condition. It is evident that variations may be made in the apparatus specifically described without departing from the spirit of the invention as described in the appended claims.

I claim:

1. In a condition controller, a frame, a valve casing, a valve mounted in said casing and having operating stems extending in opposite directions from said valve, a mount on said frame for mounting said valve casing selectively in direct and reverse positions, and a condition responsive mechanism operating one of said stems to move the valve in direct or reverse directions in accordance with the position of the valve casing on said frame.

2. In a condition controller, a frame, a valve casing, a valve mounted in said casing and having operating stems extending in opposite directions from said valve and casing, a mount on said frame on which said valve casing is rotatably moved selectively to direct or reverse positions, a condition responsive element carried by said frame, and a connector movable by said condition responsive element and contactable with one of the valve stems to move the valve in direct or reverse directions in accordance with the position of the valve casing on said frame.

3. In a condition controller, a frame, a condition responsive means mounted on said frame, a pilot valve operable by said condition responsive means and adapted to control fluid pressure to a fluid pressure operated controller, a circular pilot valve body mount on said frame for locating said pilot valve relative to said condition responsive means, and means to hold said pilot valve on said mount selectively in a direct or reverse position relative to said condition responsive means, whereby said control fluid pressure can be varied in the desired direction in response to change in said condition in one direction.

4. In a condition controller, a frame, a condition responsive means mounted on said frame, a pilot valve operable by said condition responsive means and adapted to control fluid pressure to a fluid pressure operated controller, a pilot valve body mount on said frame, a control fluid pressure manifold connected to said mount, means to connect said manifold to a source of control fluid and to a fluid pressure operated controller, and means to adjustably hold said pilot valve body on said mount selectively in a direct or reverse position, whereby said control fluid pressure can be varied in the desired direction in response to change in said condition in one direction.

5. In a condition controller, a frame, a condition responsive means mounted on said frame, a pilot valve operable by said condition responsive means and adapted to control fluid pressure to a fluid pressure operated controller, a pilot valve body mount on said frame, a control fluid pressure manifold connected to said mount, means to connect said manifold to a source of control fluid and to a fluid pressure operated controller, a restricted orifice in said manifold between the pilot valve and the source of control fluid connection, and means to adjustably hold said pilot valve on said mount selectively in a direct or reverse position, whereby said control fluid pressure can be varied in the desired direction in response to change in said condition in one direction.

6. In a condition controller, a frame, a condition responsive means mounted on said frame, a pilot valve operable by said condition responsive means and adapted to control fluid pressure to a fluid pressure operated controller, a pilot valve body mount on said frame for rotatably holding said pilot valve, a lever and adjustable fulcrum adapted to connect said condition responsive element and said pilot valve, means to adjust said fulcrum so as to change the setting point of the pilot valve and the ratio of movement of said pilot valve and condition responsive means, and means to adjustably hold said pilot valve body on said mount in a direct or a reverse position relative to said condition responsive means, whereby said control fluid pressure can be varied in the desired direction in response to change in said condition in one direction.

7. In a condition controller adapted for universal use, a frame, a condition responsive means mounted on said frame, a pilot valve operable by said condition responsive means and adapted to control fluid pressure to a fluid pressure operated controller, a pilot valve body mount on said frame, means adjustably holding said pilot valve body on said seat selectively in a direct or reverse position, a control fluid pressure manifold on said frame connected to said mount, means to connect said manifold to a source of control fluid and to a fluid pressure operated controller, and a restricted orifice comprising a removable plug with an annular groove therein cooperable with said frame to form a restricted control fluid passage to the pilot valve from the source of control fluid supply.

8. In a condition controller, a frame, a condition responsive means mounted on said frame, a pilot valve operable by said condition responsive means and adapted to control fluid pressure to a fluid pressure operated controller, said valve having a body and a plurality of operating means operable from various directions, said operating means being connected to valve means in said body, a mount on said frame for mounting said valve body selectively in any one of a plurality of directions, and clamping means holding said valve body on said mount in direct or reverse positions relative to said condition responsive means, whereby said control fluid pressure can be varied in the desired direction in response to change in said condition in one direction.

CLIFFORD B. IVES.

REFERENCES CITED

The following references are of record in the file of this patent:

UNITED STATES PATENTS

| Number | Name | Date |
| --- | --- | --- |
| 1,897,135 | Mason | Feb. 14, 1933 |
| 2,076,465 | Kirk | Apr. 6, 1937 |
| 2,258,360 | Hetzer | Oct. 7, 1941 |
| 2,283,296 | Temple | May 19, 1942 |
| 2,327,898 | Hubley | Aug. 24, 1943 |
| 2,356,970 | Brockett | Aug. 29, 1944 |
| 2,427,235 | Smoot | Sept. 9, 1947 |
| 2,461,026 | Bilyeu | Feb. 8, 1949 |